US012441543B2

(12) United States Patent
Gherardi et al.

(10) Patent No.: US 12,441,543 B2
(45) Date of Patent: Oct. 14, 2025

(54) PREDICTING A PATH OF MATERIAL HANDLING EQUIPMENT AND DETERMINING AN OBSTACLE-FREE PATH

(71) Applicant: Verity AG, Zurich (CH)

(72) Inventors: Luca Gherardi, Oberrieden (CH); Markus Florian Hehn, Zurich (CH)

(73) Assignee: Verity AG, Zurich (CH)

( * ) Notice: Subject to any disclaimer, the term of this patent is extended or adjusted under 35 U.S.C. 154(b) by 887 days.

(21) Appl. No.: 17/534,874

(22) Filed: Nov. 24, 2021

(65) Prior Publication Data

US 2022/0162001 A1 May 26, 2022

Related U.S. Application Data

(60) Provisional application No. 63/117,474, filed on Nov. 24, 2020.

(51) Int. Cl.
*B65G 1/137* (2006.01)
*B64U 10/13* (2023.01)
(Continued)

(52) U.S. Cl.
CPC ........... *B65G 1/1373* (2013.01); *B64U 10/13* (2023.01); *B65G 1/0492* (2013.01);
(Continued)

(58) Field of Classification Search
CPC .... B65G 1/1373; B65G 1/0492; B64U 10/13; B64U 2101/30; B64U 2101/64;
(Continued)

(56) References Cited

U.S. PATENT DOCUMENTS 10,249,200 B1 * 4/2019 Grenier ............... G01C 23/005
10,336,543 B1   7/2019 Sills et al.
(Continued)

FOREIGN PATENT DOCUMENTS

EP   3220227 A1 * 9/2017 ............. B64F 1/007
JP   2018055695 A * 4/2018 ........... B64C 39/024
(Continued)

OTHER PUBLICATIONS

JP-2018055695-A, Ling, et al. (Year: 2018).*
(Continued)

*Primary Examiner* — Ernesto A Suarez
*Assistant Examiner* — Laurence R Brothers
(74) *Attorney, Agent, or Firm* — Haley Guiliano LLP (57) ABSTRACT

Systems and methods are provided for determining obstacle-free paths of an areal vehicle in a warehouse and for determining shortcuts to be generated in the warehouse to increase the number of obstacle-free paths available to the areal vehicle. The systems and methods include predicting at least one location of an inventory moving device in the warehouse based on the status of received inventory moving tasks, and determining an obstacle-free path of an aerial vehicle to a desired location in the warehouse based on the predicted at least one location of the inventory moving device. The systems and methods also include receiving inventory validation tasks in a warehouse comprising a plurality of storage racks, requesting, based on the received inventory validation tasks, a shortcut to be generated in a storage rack of the plurality of storage racks to provide a path segment for performing the inventory validation task.

20 Claims, 4 Drawing Sheets

(51) Int. Cl.
*B65G 1/04* (2006.01)
*G05D 1/00* (2006.01)
*G05D 1/46* (2024.01)
*G05D 1/467* (2024.01)
*G05D 1/48* (2024.01)
*G05D 1/622* (2024.01)
*G05D 1/648* (2024.01)
*G06Q 10/087* (2023.01)
*B64C 39/02* (2023.01)
*B64U 101/30* (2023.01)
*B64U 101/64* (2023.01)
*B64U 101/70* (2023.01)
*G05D 1/644* (2024.01)
*G05D 109/20* (2024.01)

(52) U.S. Cl.
CPC .......... G05D 1/0088 (2013.01); G05D 1/101 (2013.01); G05D 1/46 (2024.01); G05D 1/467 (2024.01); G05D 1/48 (2024.01); G05D 1/622 (2024.01); G05D 1/648 (2024.01); G06Q 10/087 (2013.01); *B64U 2101/70* (2023.01); *B64U 2201/10* (2023.01); *B64U 2201/20* (2023.01); *G05D 2109/20* (2024.01)

(58) Field of Classification Search
CPC ............ B64U 2101/70; B64U 2201/10; B64U 2201/20; G05D 1/0088; G05D 1/101; G05D 1/104; G05D 1/46; G05D 1/467; G05D 1/48; G05D 1/622; G05D 1/648; G05D 2109/20; G06Q 10/087; B64C 39/024

See application file for complete search history.

(56) References Cited

U.S. PATENT DOCUMENTS

2016/0129592 A1* 5/2016 Saboo ...................... B25J 5/007
  700/248
2017/0190510 A1   7/2017 Porat
2018/0252542 A1*  9/2018 Bruni ................. G06Q 10/0835

FOREIGN PATENT DOCUMENTS

WO   WO-2005039837 A1 *  5/2005   ....... G05B 19/41885
WO       2017/137393 A1     8/2017
WO   WO-2019181283 A1 *  9/2019   ........... B65G 1/0407

OTHER PUBLICATIONS

Kakinuki, et al., WO-2019181283-A1 (Year: 2019).*
Invitation to Pay Additional Fees and Communication Relating to Results of Partial International Search, dated Mar. 17, 2022, issued in International Application No. PCT/EP2021/082899 (12 pages).
Francesco et al., "Automated Picking System Employing a Drone", 2019 15th International Conference on Distributed Computing in Sensor Systems (DCOSS), IEEE, May 29, 2019, pp. 633-640.

* cited by examiner

PREDICTING A PATH OF MATERIAL HANDLING EQUIPMENT AND DETERMINING AN OBSTACLE-FREE PATH

CROSS-REFERENCE TO RELATED APPLICATION

This application claims priority to U.S. Provisional Patent Application No. 63/117,474, filed on Nov. 24, 2020, the entire contents of which are hereby expressly incorporated by reference in their entirety.

INTRODUCTION

Many warehouse management systems require workers to scan items manually, which is a time-consuming and error-prone process. Accordingly, some warehouse systems may use unmanned aerial vehicles (UAVs) to perform such inventory validation tasks. In one example, UAVs (e.g., drones) may use optical sensors (e.g., cameras), radio-frequency identification (RFID) scanners, or other near-field communication technologies to locate and identify inventory items in a warehouse and communicate collected information to a warehouse management system. Thus, the warehouse management system may detect individual items and accurately track inventory without requiring a worker to scan items manually.

SUMMARY

In one approach, a warehouse management system may generate routes for drones to perform inventory validation tasks using static information (e.g., a warehouse map). For example, the warehouse management system may generate routes by determining the shortest route to desired locations (e.g., through aisles of a warehouse). However, it may be difficult for drones to quickly navigate through a warehouse to a desired location without risking collisions with inventory moving devices (e.g., forklifts) moving inventory throughout the warehouse. In some approaches, in order to avoid collisions between drones and inventory moving devices, the warehouse management system may rely on the drones to employ collision avoidance technology to avoid colliding with inventory moving devices, and, if necessary, to find an alternative route if there are problems reaching a desired location. However, in such an approach, drones are required to fly much slower than they are capable of flying (e.g., in order to avoid detected obstacles). Additionally, drones may waste a significant amount of time trying to determine an alternative route when an assigned route is blocked.

Consequently, what is needed are techniques to determine obstacle-free paths for drones to desired locations in a warehouse based on dynamic information, including, e.g., the predicted locations of inventory moving devices in the warehouse and available shortcuts through storage racks of the warehouse. Additionally, it would be advantageous to generate shortcuts through storage racks in the warehouse to provide additional path segments through the warehouse to regions of the warehouse where there is difficulty in performing inventory validation tasks and no shortcuts to the regions are currently available.

In some embodiments, methods and systems are provided for determining an obstacle-free path of an aerial vehicle to a desired location in a warehouse. Status of inventory moving tasks for the warehouse are received. At least one location of an inventory moving device in the warehouse is predicted based on the status of the inventory moving tasks. The obstacle-free path is determined based on the predicted at least one location of the inventory moving device.

In some embodiments, the inventory moving tasks include a task to move an inventory item from a first location to a second location in the warehouse.

In some embodiments, at least one location of the inventory moving device in the warehouse may be predicted by identifying a task, among the inventory moving tasks, associated with moving an inventory item from a first location to a second location, determining a predicted route from the first location to the second location for the identified task, and predicting the at least one location of the inventory moving device along the predicted route based on the status of the identified task. In some embodiments, the route may be predicted by analyzing past routes taken by inventory moving devices in the warehouse.

In some embodiments, the obstacle-free path is determined by determining a plurality of paths from a current location of the aerial vehicle to the desired location, based on free space around a plurality of storage racks arranged in the warehouse, and selecting one of the determined plurality of paths that does not intersect the predicted at least one location of the inventory moving device as the obstacle-free path of the aerial vehicle, based on estimated travel times or distances of the aerial vehicle from the current location to the desired location along each of the plurality of paths. In some embodiments, the plurality of storage racks may be arranged into a plurality of rows in a storage area of the warehouse, and the free space around the plurality of storage racks may include aisles separating adjacent ones of the plurality of storage racks arranged in the plurality of rows and at least one thruway of the storage area. In some embodiments, the free space around the plurality of storage racks further includes a shortcut through a first one of the plurality of storage racks that is formed by at least one empty storage location of the first one of the plurality of storage racks.

In some embodiments, the obstacle-free path is determined by determining a plurality of path segments along at least one of: the at least one thruway, one or more of the aisles, or the shortcut. In some embodiments, the shortcut may be generated by instructing the inventory moving device to remove an inventory item from the first one of the plurality of storage racks to create the at least one empty storage location.

In some embodiment, the at least one location of the inventory moving device in the warehouse is predicted by determining a two-dimensional path of the inventory moving device on a ground of the warehouse based on the status of the inventory moving tasks. In some embodiments, the obstacle-free path includes an obstacle-free three-dimensional path.

In some embodiments, the warehouse includes a plurality of storage racks arranged in a storage area of the warehouse. In some embodiments, the obstacle-free three-dimensional path is determined by determining, in space above the two-dimensional path, a plurality of three-dimensional paths from a current location of the aerial vehicle to the desired location, determining whether each of the determined plurality of three-dimensional paths intersects with the inventory moving device, and selecting one of the determined plurality of three-dimensional paths determined to not intersect with the inventory moving device as the obstacle-free three-dimensional path, based on estimated travel times of the aerial vehicle along each of the plurality of three-dimensional paths.

In some embodiments, a method is provided for determining an obstacle-free three-dimensional path of an aerial vehicle to a location in a warehouse. Status of ground-based mobile machines that travel in two-dimension paths on a ground of the warehouse is received. The obstacle-free three-dimensional path is determined based on the status of the ground-based mobile machines.

In some embodiments, methods and systems are provided for requesting a shortcut to be generated in a storage rack to provide a path segment for performing an inventory validation task. Inventory validation tasks in a warehouse including a plurality of storage racks are received. The request for the shortcut to be generated in the storage rack among the plurality of storage racks is based on the received inventory validation tasks.

In some embodiments, requesting the shortcut to be generated in the storage rack includes determining a region of the warehouse where there is difficulty in performing inventory validation tasks, identifying the shortcut to be generated to reach the region of warehouse, and requesting the identified shortcut to be generated in the storage rack.

In some embodiments, the region is determined by determining that one or more inventory validation tasks for the region were not completed within a predetermined amount of time, more than a predetermined number of inventory validation tasks for the region are outstanding, or more than a predetermined number of inventory validation tasks for the region have been pending for more than a predetermined amount of time.

In some embodiments, the region is determined by identifying, from the received inventory validation tasks, more than a predetermined number of inventory validation tasks for the region, and determining that the region has limited access paths. In some embodiments, determining that the region has limited access paths includes determining an obstruction in an existing path segment to the region. In some embodiments, determining that the region has limited access paths includes determining that the shortcut would reduce the time taken to perform the inventory validation tasks for the region by more than a predetermined amount. In some embodiments, determining that the region has limited access paths includes determining that the shortcut would reduce energy consumption of one or more aerial vehicles performing the inventory validation tasks for the region by more than a predetermined amount.

In some embodiments, the plurality of storage racks is arranged in a plurality of rows defining aisles separating adjacent ones of the plurality of rows. In some embodiments, the region is located in an aisle among the aisles separating adjacent ones of the plurality of rows. In some embodiments, determining that the region has limited access paths includes determining that one end of the aisle has an obstruction preventing an aerial vehicle from entering the one end of the aisle to perform the inventory validation.

In some embodiments, the inventory validation tasks are received from a warehouse management system. Results of the inventory validation tasks may be transmitted to the warehouse management system.

In some embodiments, the plurality of storage racks is arranged in a plurality of rows defining aisles separating adjacent ones of the plurality of rows. In some embodiments, requesting the shortcut to be generated in the storage rack includes requesting an inventory item to be removed from at least one storage location of the storage rack such that an aerial vehicle is able to travel between adjacent aisles by traversing through the storage rack at the at least one storage location using the path segment.

In some embodiments, a non-transitory computer-readable medium comprising non-transitory computer-readable instructions encoded thereon for managing a warehouse is provided. The instructions include an instruction for receiving inventory validation tasks in a warehouse including a plurality of storage racks. The instructions further include an instruction for requesting, based on the received inventory validation tasks, a shortcut to be generated in a storage rack of the plurality of storage racks to provide a path segment for performing the validation task.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
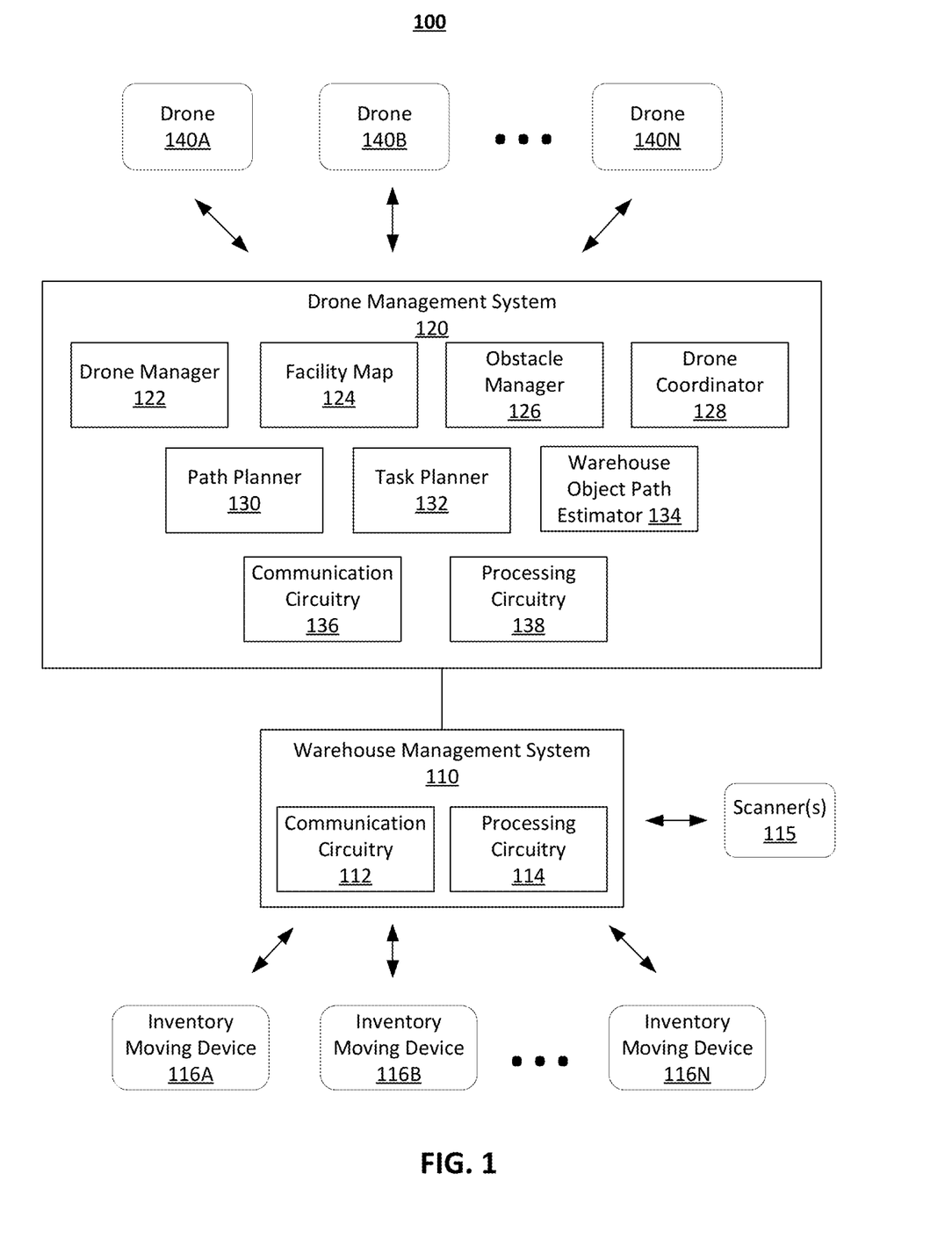
FIG. 1 shows a block diagram of an illustrative warehouse system, in accordance with some embodiments of this disclosure.

FIG. 1 shows a block diagram of an illustrative warehouse system 100, in accordance with some embodiments of this disclosure. System 100 may be implemented in any suitable warehouse or location that stores and manages goods, materials, or any other types of objects (e.g., inventory items). For example, system 100 may be implemented in large distribution facilities. System 100 includes a warehouse management system 110 and drone management system 120.

Warehouse management system 110 controls warehouse operations. As shown, warehouse management system 110 is communicatively coupled to drone management system 120, scanner(s) 115, and inventory moving devices 116A, 116B, . . . , and 116N (collectively referred to as inventory moving devices 116). Depending on the type of warehouse, warehouse management system 110 may control warehouse operations starting from when items enter the warehouse until the objects leave the warehouse. Warehouse management system 110 can manage warehouse tasks such as the picking of items from shelves for shipping and storing received items on shelves by generating inventory moving tasks that are communicated to inventory moving devices 116. Warehouse management system 110 may track the location of items within the warehouse using barcodes. However, this is only one example, and warehouse management system 110 may also track the location of items within the warehouse using RFID tags or any other suitable identifiers. When items arrive, the items are scanned using, e.g., scanners 115. In some situations, the items arrive with one or more barcodes already on the items and one or more of these barcodes are used by warehouse management system 110 for tracking purposes. In other situations, barcodes are added to the items or pallets associated with the items.

For various reasons, the location information for items in a warehouse may be inaccurate. For example, a worker may move an item to an incorrect location or a worker may forget to scan a location barcode after moving an item, and thus the location information managed by warehouse management system 110 may include errors. These errors can impact upstream and downstream operations and the overall efficiency of a warehouse. Accordingly, warehouse management system 110 may request inventory validation tasks to be performed to confirm the location of items in the warehouse. In some embodiments, as explained below, the inventory validation tasks can be transmitted to drone management system 120 to be performed autonomously or semi-autonomously.

Warehouse management system 110 may comprise processing circuitry 114 which may comprise hardware, software or any combination thereof, such as, for example, one or more central processing units (CPUs) configured to execute instructions stored in computer-readable media (e.g., memory) to implement operating system(s) and applications of warehouse management system 110 and perform and/or control various operations of the warehouse. Warehouse management system 110 may further comprise communication circuitry 112 configured to transmit and receive communications from inventory moving devices 116, scanners 115, and drone management system 120. Communication circuitry 112 may also be configured to transmit and receive communications between components within warehouse management system 110.

The memory of processing circuitry 114 may comprise one or more of, for example, Random Access Memory (RAM), Read Only Memory (ROM), EEPROM, ASIC, optical storage, magnetic storage, flash memory, solid state memory, or any combination thereof, or any other suitable medium used to store data. The memory may be configured to store one or more instructions (e.g., in the form of an application) executable by processing circuitry 114 to, for example, manage the locations of objects in the warehouse and to request inventory validation tasks. Any suitable programming languages may be employed to implement such instructions and applications, e.g., Java, C, Python, Go, JavaScript (e.g., React library, Nodejs), Typescript, Handlebar, React, etc.

Drone management system 120 controls drones 140A, 140B, . . . , and 140N (collectively referred to as drones 140) within the warehouse. As shown, drone management system 120 is communicatively coupled to drones 140, and warehouse management system 110. As shown, drone management system 120 may comprise a plurality of modules (e.g., drone manager 122, facility map 124, obstacle manager 126, drone coordinator 128, path planner 130, task planner 132, and warehouse object path estimator 134) and processing circuitry 124 which may comprise hardware, software or any combination thereof, such as, for example, one or more central processing units (CPUs) configured to execute instructions stored in computer-readable media (e.g., memory) to implement operating system(s) and applications of drone management system 120 and manage task for drones 140. In some embodiments, processing circuitry 138 implements one or more of the plurality of modules (e.g., 122-134). Drone management system 120 may further comprise communication circuitry 136 configured to transmit and receive communications from/to drones 140 and warehouse management system 110. Communication circuitry 136 may also be configured to transmit and receive communications between components within drone management system 120. In some implementation, drone management system 120 may retrieve information from warehouse management system 110 using an API.

The memory of processing circuitry 138 may comprise one or more of, for example, Random Access Memory (RAM), Read Only Memory (ROM), EEPROM, ASIC, optical storage, magnetic storage, flash memory, solid state memory, or any combination thereof, or any other suitable medium used to store data. The memory may be configured to store one or more instructions (e.g., in the form of an application) executable by processing circuitry 138 and/or the plurality of modules (e.g., 122-134) to, for example, manage tasks such as inventory validation tasks. Any suitable programming languages may be employed to implement such instructions and applications, e.g., Java, C, Python, Go, JavaScript (e.g., React library, Nodejs), Typescript, Handlebar, React, etc.

Drone management system 120 controls drones 140 to perform tasks, such as the inventory validation tasks received from warehouse management system 110. For example, drone management system 120 may receive inventory validation tasks from warehouse management system 110 and store the tasks in a tasks database (e.g., implemented by task planner 132). Drone management system 120 may then assign the inventory validation tasks to specific ones of drones 140 to perform. When assigning inventory validation tasks, drone management system 120 may determine obstacle-free paths to perform the inventory validation tasks, as discussed in further detail below. In some embodiments, drones 140 are autonomous aerial vehicles that are capable of navigating through the warehouse to specific locations (e.g., aerial robots). Drones 140 may include one or more sensors such as a camera that are used to capture images of locations in the warehouse and identifiers of items in the warehouse. Captured images and/or data, can be used to validate the location information managed by warehouse management system 110.

Drone manager 122 may maintain a database of information of drones 140. The information may include properties and current status information of each drone 140 (e.g., static and dynamic information). For example, for each drone 140, drone manager 122 may store drone properties such as size, maximum velocity and acceleration, communication information, etc. (e.g., static information), as well as current status such as current location (e.g., within the warehouse), current charge level, current available flight time, etc. (e.g., dynamic information). Drone manager 122 may periodically (or in real-time) update the current status of each drone 140 based on information received from drone coordinator 128.

Drone coordinator 128 may coordinate operations of drones 140 (e.g., instructing drones 140 to fly along obstacle-free paths to desired locations within the warehouse to perform specified operations such as inventory validation tasks). Drone coordinator 128 may further receive telemetry about the status of each drone 140 (e.g., through communication circuitry 136). Facility map 124 may maintain a map of the warehouse environment including information for all static objects present in the warehouse (e.g., the location, size, name, etc. of the objects) and the fixed paths for navigating between the static objects (e.g., aisles and thruways). In one embodiment, facility map 124 maintains status information of each storage location in the warehouse (e.g., whether each storage location is empty or is currently storing an item). For example, in a warehouse having a plurality of storage racks each having a plurality of storage locations (e.g., on each of a plurality of shelves), facility map 124 may maintain status information for each storage location of each storage rack in order to identify storage locations that are empty that drones 140 are able to fly through (e.g., temporary paths). In some embodiments, facility map 124 may be populated with information received from warehouse management system 110. In some embodiments, this information may be periodically verified based on images captured by one or more drones 140.

Obstacle manager 126 may identify and track dynamic obstacles in the warehouse (e.g., that are not represented by facility map 124). In some embodiments, dynamic obstacles (e.g., an inventory item in an aisle of the warehouse, movable storage racks, etc.) may be detected by one or more drone 140. For example, drones 140 may be instructed to capture images of the warehouse when performing inventory validation tasks. In some embodiments, in response to detecting an obstacle, drone 140 may communicate information about the obstacle (e.g., an image and location) to obstacle manager 126 (e.g., through drone coordinator 128).

Path planner 130 may determine a best path (e.g., an obstacle-free path) for drone 140 to a desired location in the warehouse (e.g., associated with an inventory verification task specified by warehouse management system 110) based on, e.g., information provided by drone manager 122, facility map 124, obstacles manager 123. In some embodiments, the desired location includes a plurality of locations specified by the inventory verification task (e.g., a plurality of locations in an aisle). In some embodiments, the determined best path (e.g., from among a plurality of possible paths) is associated with the type of tasks. For example, for certain tasks, path planner 130 considers all possible constraints (e.g., including obstacles, maximum drone velocity, drone charge level, etc.) that allows drone 140 to perform an inventory validation task in the shortest time. For other tasks, path planner 130 may minimize energy usage of drone 140. Path planner 130 may utilize different algorithms to optimize different variables for different tasks.

Warehouse object path estimator 134 may predict paths of inventory moving devices 116 using information retrieved from warehouse management system 110. For example, warehouse object path estimator 134 may retrieve information regarding inventory moving tasks generated for inventory moving devices 116. Based on this retrieved information, warehouse object path estimator 134 may estimate paths that inventory moving devices 116 will take based on, e.g., current locations of inventory moving devices 116, one or more locations associated with inventory moving tasks (e.g., pickup and drop-off locations), the types of inventory moving devices 116 (e.g., operating heights). In some implementations, inventory moving devices 116 may include localization sensors to determine their current location and position. Inventory moving devices 116 may communicate this information to warehouse management system 110 periodically or in real time. In some implementations, warehouse management system 110 may utilize sensors in the warehouse (e.g., cameras) to monitor locations of inventory moving devices 116.

Drone management system 120 may be communicatively connected to warehouse management system 110 by an integration layer that connects application programming interfaces (APIs) of the two systems. In some embodiments, warehouse management system 110 and drone management system 120 may be remote systems that communicate with each other over the Internet or other suitable communication interfaces. It will be understood that while warehouse management system 110 and drone management system 120 are depicted as separate systems, in some embodiments, the functionality can be included in a single system. For example, the functionality performed by drone management system 120 may be included in warehouse management system 110. Operation of warehouse system 100 is described in greater detail below with reference to FIG. 2.

Figure 2:
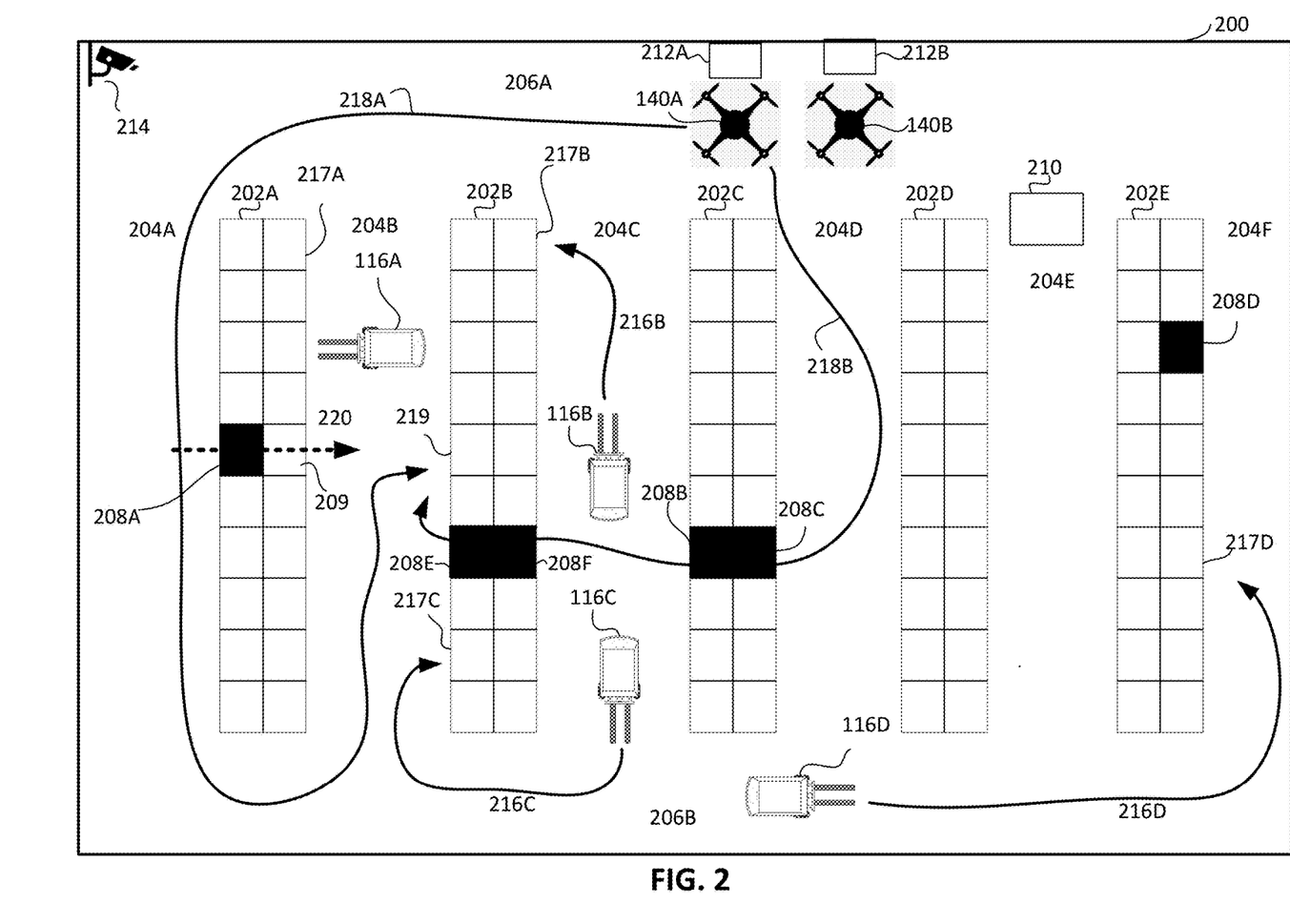
FIG. 2 shows an illustrative plan view of a warehouse and a determination of an obstacle-free path of a drone to a desired location within the warehouse, in accordance with some embodiments of this disclosure.

FIG. 2 shows an illustrative plan view of a warehouse 200 and the determination of an obstacle-free path of drone 140A to a desired location 219 within warehouse 200, in accordance with some embodiments of this disclosure. Operation of warehouse 200 and determination of obstacle-free path 218 may be performed by warehouse system 100 of FIG. 1. For example, as described above, warehouse management system 110 may instruct inventory moving devices 116A-116D to perform inventory moving tasks for warehouse 200 and drone management system 120 may instruct drones 140A and 140B to perform inventory validation tasks for warehouse 200. As shown, drones 140A and 140B may automatically recharge by docking on charging stations 212A and 202B located in warehouse 200.

As shown, warehouse 200 includes a plurality of storage racks 202A-202E (collectively referred to as storage racks 202) arranged in a plurality of rows in a storage area of warehouse 200. Ground space around the plurality of storage racks (e.g., navigable by inventory moving devices 116) may include a plurality of aisles 204A-204F and one or more thruways 206A and 206B (e.g., fixed paths). However, it should be understood that FIG. 2 shows a simplified view of a warehouse and that storage racks 202 may be arranged in any suitable manner within warehouse 200. As shown, each storage rack 202 includes a plurality of storage locations for each shelf of each storage rack 202. As described above, drone management system 120 tracks a current storage status (e.g., empty or occupied) of each storage location in each storage rack 202 (e.g., based on information from warehouse management system 110). For example, as shown, drone management system 120 may indicate storage location 208A in storage rack 202A, storage locations 208E and 208F in storage rack 202B, storage locations 208B and 208C in storage rack 202C, and storage location 208D in storage rack 202E as storage locations that are not currently occupied by an item. Based on the empty storage locations, drone management system 120 may identify shortcuts through storage racks that drones 140 are able to pass through (e.g., temporary paths). For example, as shown, drone management system 120 may identify a first current shortcut through storage rack 202C (at empty storage locations 208B and 208C) that drones 140 may use to travel between aisles 204C and 204D, and a second current shortcut through storage rack 202B (at empty storage locations 208E and 208F) that drones 140 may use to travel between aisles 204B and 204C.

Based on an inventory validation task to be executed by drone 140A, warehouse system 100 (e.g., drone management system 120) may predict paths of each inventory moving device 116A-116D, based on the status of inventory moving tasks of warehouse management system 100 (e.g., based on current locations of each inventory moving device 116A-116D) and the time when the inventory validation task is to be executed (e.g., a current time). For example, as shown, inventory moving device 116A is projected to remain in place, inventory moving device 116B is projected to travel along path 216B to location 217B, inventory moving device 116C is projected to travel along path 216C to location 217C, and inventory moving device 116D is projected to travel along path 216D to location 217D. A traveling speed of each inventory moving device 116 may be projected based on the inventory moving tasks and information about each inventory moving device 116 (e.g., the type of inventory moving device). In some implementations, travel paths are determined by analyzing past routes taken by inventory moving devices in warehouse 200. In some implementations, warehouse 200 may include one or more sensors (e.g., camera 214) that provide information to warehouse system 100. For example, camera 214 may identify an obstacle (e.g., obstacle 210) in aisle 204E that is not tracked by warehouse management system 110. In some implementations, warehouse management system 110 may monitor locations of inventory moving devices 116.

Drone management system 120 may identify a desired location (e.g., desired location 219) associated with an inventory validation task generated by warehouse management system 110. Based on desired location 219 and the current status of drones 140A and 140B (e.g., current location, charge level, availability, type, etc.), drone management system 120 may assign the inventory validation task to drone 140A. In some implementations, inventory validation tasks may be assigned to drones 140 in a predetermined order.

Drone management system 120 may identify obstacle-free path segments (e.g., along both fixed paths and temporary paths), based on the current location of drone 140A, desired location 219, and projected paths of inventory moving devices 116. In some instances, by considering both temporary paths (e.g., the first and second shortcuts) as well as the fixed paths (e.g., aisles 204 and thruways 206), drone management system 120 is able to increase the number of available obstacle-free paths to a desired location. For example, as shown, based on the identified obstacle-free path segments and the first and second shortcuts, drone management system 120 may identify a plurality of possible obstacle-free paths 218A and 218B from a current location of drone 140A to desired location 219. For example, drone management system 120 may determine that aisle 204C is blocked by inventory moving devices 116B and 116C, but identify obstacle-free path 218A along thruway 206A, down aisle 204A, across thruway 206B, and up aisle 204B. More specifically, drone management system 120 may determine that one end of aisle 204B is blocked by inventory moving device 116A, but the opposite end of aisle 204B is free. For example, as shown, although inventory moving device 116C is predicted to travel along path 216C to desired location 217C, drone management system 120 may determine that drone 140A will be able to reach the end of aisle 204B either before inventory moving device 116C or that drone 140A will be able to travel above inventory moving device 116C in aisle 204B, based on an operating height of inventory moving device 116C. For example, drone management system 120 may retrieve a maximum traveling height (e.g., the maximum height of inventory moving device 116C while inventory moving device 116C is moving) and a maximum operating height (e.g., the maximum height of inventory moving device 116C while inventory moving device 116C is stationary), based on, e.g., the type of inventory moving device 116C In response to determining that drone 140A is able to travel over inventory moving device 116C, drone management system 120 may determine a three-dimensional, obstacle-free path of drone 140A to reach desired location 219. For example, available heights along a path may be divided into n number of different possible path heights (e.g., each corresponding to one meter of height). Ceiling obstructions (e.g., beams, lights, etc.) may reduce available heights in certain areas, while inventory moving devices 116, depending on their operating height or height of cargo (e.g., inventory item), may obstruct the lower several path heights. Thus, three-dimensional, obstacle-free paths may be generated in available path heights (e.g., not obstructed by warehouse 200 or inventory moving devices 116).

In some implementation, drone management system 120 uses an algorithm (e.g., Dijkstra's Algorithm) to find the shortest path about the plurality of possible-obstacle-free paths if multiple obstacle-free paths are identified. For example, drone management system 120 may identify path 218B as the best obstacle-free path for drone 140A to travel to desired location 219. Drone management system 120 may provide identified path 218B to drone 140A along with instructions to perform the inventory validation task to be executed.

In some implementations, only a single obstacle-free path to a desired location may be identified. In some implementations, drone management system 120 may identify potential locations to generate shortcuts in one or more storage racks 202. For example, as shown, drone management system 120 may identify potential shortcut 220 as a shortcut to be generated, as only a single storage location (storage location 209) needs to be emptied (e.g., thereby creating path 220 through empty storage locations 208A and 209). However, this is only one example, and it should be understood that certain storage racks may only include a single row of storage locations (e.g., accessible from either side of the storage rack). Based on the identified potential shortcut 220, drone management system 120 may request warehouse management system 110 to generate an inventory moving task for inventory moving device 116 to remove the item currently stored in the identified potential shortcut (e.g., at 209), if, e.g., generating shortcut 220 will save more than a predetermined amount of travel time to desired location 219. Generating shortcuts between storage racks 202 is explained in greater detail below with reference to FIG. 3.

In some implementations, if a suitable path to a desired location is not immediately identified (e.g., due to the projected paths of inventory moving devices 116), drone management system 120 and warehouse management system 110 may coordinate the overlapping inventory validation task and inventory moving tasks to a generate an obstacle-free path. For example, if the inventory validation task specified a desired location in aisle 204C, which is currently blocked by inventory moving devices 116B and C, warehouse management system 110 and drone management system 120 may reschedule at least one of the inventory moving tasks and the inventory validation tasks.

Figure 3:
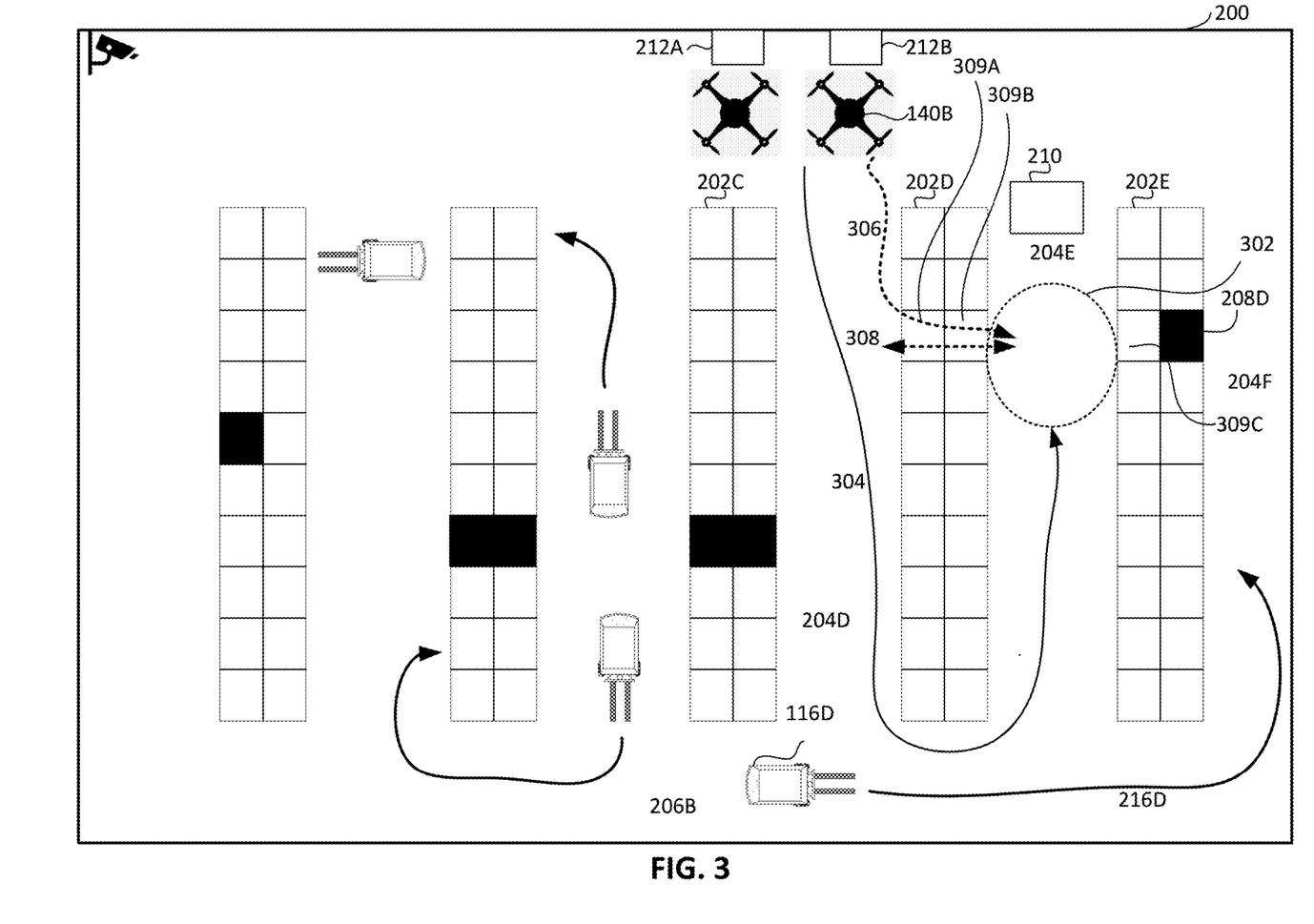
FIG. 3 shows an illustrative plan view of the warehouse of FIG. 2 and a determination of a shortcut to be generated in a storage rack within the warehouse, in accordance with some embodiments of this disclosure.

FIG. 3 shows an illustrative plan view of warehouse 200 of FIG. 2 and the determination of a shortcut to be generated in a storage rack within warehouse 200, in accordance with some embodiments of this disclosure. As shown, drone management system 120 may identify a region 302 where there is difficulty in performing one or more inventory verification tasks. For example, drone management system 120 may identify region 302 by determining that inventory validation tasks associated with region 302 are not being completed within a predetermined amount of time, that more than a predetermined number of inventory validation tasks for region 302 are outstanding, or that more than a predetermined number of inventory validation tasks for the region have been pending for more than a predetermined amount of time, etc. In this case, drone management system 120 may further determine whether region 302 has limited access paths that make it difficult to complete inventory validation tasks. For example, as shown, drone management system 120 may determine that region 302 has limited access paths as drone 140B would have to travel down aisle 204D before traveling back up adjacent aisle 204E along determined obstacle-free path 304 due to obstacle 210 blocking one end of aisle 204E.

Based on identifying region 302 where there is difficulty in performing one or more inventory verification tasks and that access to region 302 is limited, drone management system 120 may identify possible storage locations in storage racks 202 for generating a shortcut for drone 140B to access region 302. For example, as shown, drone management system 120 may identify storage locations 309A and 309B to be emptied (e.g., to thereby shortcut 308 through empty storage locations 309A and 309B, which drone 140B may travel through on path 306). Because storage racks 202 require adjacent storage locations from opposite sides of the storage rack to be empty to form a path though the storage rack (e.g., 309A and 309B), drone management system 120 may also identify possible shortcuts that are able to be generated by emptying only one storage location. That is, drone management system 120 may identify storage locations that are already empty (e.g., 208D) to reduce the amount of work required to generate a shortcut. For example, drone management system 120 may identify storage location 309C to be emptied (e.g., to thereby create a path through empty storage locations 309C and 208D). Although a path through the possible shortcut through storage rack 202E may be longer than the possible shortcut through storage rack 202D, drone management system 120 may nonetheless determine to generate the possible shortcut through storage rack 202E in order to save time in generating the shortcut (e.g., by only requiring one storage location to be emptied instead of two). However, this is only one example, and drone management system 120 may identify one or more possible shortcuts to be generated based on any suitable factors (e.g., drone travel times along different shortcuts, current location and availability of inventory moving devices 116, obstacle free paths to the targeted storage locations to be emptied, etc.).

In some implementations, if drone management system 120 determines that an obstacle blocking one or more of drones 140A and 140B from traveling to/from charging stations 212A or 212B, drone management system 120 may determine that the obstacle should be moved to allow the one or more drones 140A and 140B to recharge and or leave the charger to perform one or more inventory verification tasks.

Figure 4:
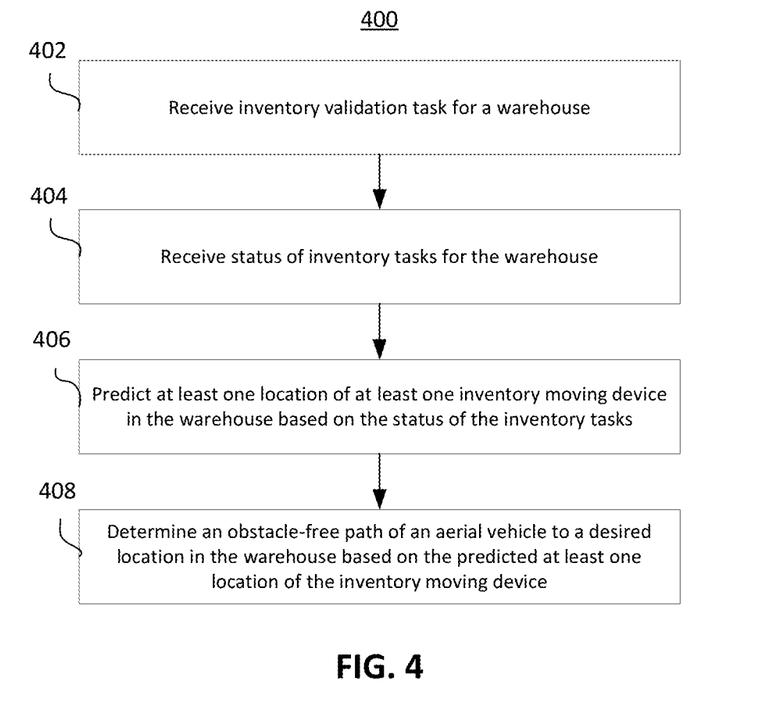
FIG. 4 is a flowchart of an illustrative process for determining an obstacle-free path of a drone to a desired location in a warehouse, in accordance with some embodiments of this disclosure.

FIG. 4 is a flowchart of an illustrative process 400 for determining an obstacle-free path of a drone to a desired location in a warehouse, in accordance with some embodiments of this disclosure. In various embodiments, the individual steps of process 400 may be implemented by one or more components of the devices and systems of FIG. 1. Although the present disclosure may describe certain steps of process 400 (and of other processes described herein) as being implemented by certain components of the devices and systems of FIG. 1, this is for purposes of illustration only, and it should be understood that other components of the devices and systems of FIG. 1 may implement those steps instead.

At 402, processing circuitry (e.g., 138 and/or task planner 132) may receive an inventory validation task for a warehouse. In some embodiments, the inventory validation task may be generated by processing circuitry 114 of warehouse management system 110. In some embodiments, the receiving is performed by communication circuitry 136. In some embodiments, warehouse management system 110 may prioritize certain inventory validation tasks over inventory moving tasks. For example, if the estimated time to complete an inventory validation task may be reduced by more than a predetermined amount (e.g., half) if a currently scheduled inventory moving task is delayed, warehouse management system 110 may reschedule the inventory moving task. For example, drone management system 120 may provide a message to warehouse management system 110 indicating, e.g., that if a certain path or aisle is not occupied by an inventory moving device 116 for the next fifteen minutes, the entire area will be able to be scanned immediately. Based on this message, drone management system 120 may determine whether scanning the entire area (e.g., performing a scheduled inventory validation task) is more important than retrieving or deposing an item in the same area (e.g., performing a scheduled inventory moving task) and prioritize one of the tasks based on the determination.

At 404, processing circuitry (e.g., 138 and/or warehouse object path estimator 134) may receive the status of inventory moving tasks for the warehouse. In some embodiments, the received status may include current location information of one or more inventory moving devices 116 performing or scheduled to perform one or more of the inventory moving tasks and a current status (e.g., current completion percentage) the one or more inventory moving tasks.

At 406, processing circuitry (e.g., 138 and/or warehouse object path estimator 134) may predict at least one location of at least one inventory moving device (e.g., inventory moving device 116) in the warehouse based on the status of the inventory moving tasks. For example, warehouse object path estimator 134 may predict paths of inventory moving devices 116 using information retrieved from warehouse management system 110. For example, warehouse object path estimator 134 may retrieve information regarding inventory moving tasks generated for inventory moving devices 116. Based on this retrieved information, warehouse object path estimator 134 may estimate paths that inventory moving devices 116 will take based on, e.g., current locations of inventory moving devices 116, one or more locations associated with inventory moving tasks (e.g., pickup and drop-off locations), the types of inventory moving devices 116 (e.g., operating heights). In some implementations, inventory moving devices 116 may include localization sensors to determine their current location and position. Inventory moving devices 116 may communicate this information to warehouse management system 110 periodically or in real time. In some implementations, warehouse management system 110 may utilize sensors in the warehouse (e.g., cameras) to monitor locations of inventory moving devices 116.

At 408, processing circuitry (e.g., 138 and/or path planner 130) may determine an obstacle-free path of an aerial vehicle (e.g., drone 140) to a desired location in the warehouse based on the predicted at least one location of inventory moving devices 116. For example, processing circuitry (e.g., 138 and/or path planner 130) may determine if a segment will be free when drone 140 reaches a segment by predicting at least one location of inventory moving devices 116 when drone 140 reaches the segment (e.g., based on the speed of inventory moving devices 116 and the speed of drone 140). In some implementations, it may be advantageous to add a buffer to account for slower/faster traveling of drone 140 and inventory moving devices 116. For example, as described above with reference to FIG. 2, processing circuitry (e.g., 138 and/or path planner 130) may determine that drone 140A will reach the end of aisle 204B before inventory moving device 116C. In this case, although the predicted paths of drone 140A and inventory moving device 116C appear to overlap, the predicted path of drone 140A will be obstacle free when drone 140A reaches the aisle 204B along path 218A. In some implementations, if multiple paths are identified (e.g., 218A and 218B), processing circuitry 138 or path planner 130 may select one of the multiple paths 218A and 218 by optimizing certain variables (e.g., shortest path, shortest travel time, etc.).

Figure 5:
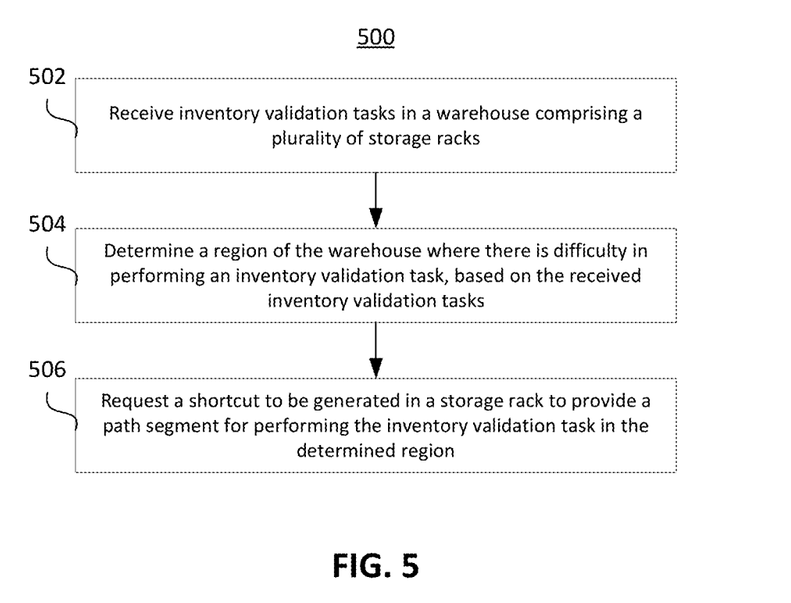
FIG. 5 is a flowchart of an illustrative process for determining a shortcut to be generated in a storage rack in a warehouse, in accordance with some embodiments of this disclosure.

FIG. 5 is a flowchart of an illustrative process 500 for determining a shortcut to be generated in a storage rack in a warehouse, in accordance with some embodiments of this disclosure. In various embodiments, the individual steps of process 500 may be implemented by one or more components of the devices and systems of FIG. 1. Although the present disclosure may describe certain steps of process 500 (and of other processes described herein) as being implemented by certain components of the devices and systems of FIG. 1, this is for purposes of illustration only, and it should be understood that other components of the devices and systems of FIG. 1 may implement those steps instead.

At 502, processing circuitry (e.g., 138 and/or task planner 132) may receive inventory validation tasks for a warehouse. In some embodiments, the inventory validation tasks may be generated by processing circuitry 114 of warehouse management system 110. In some embodiments, the receiving is performed by communication circuitry 136.

At 504, processing circuitry (e.g., 138 and/or task planner 132) may determine a region of the warehouse (e.g., 302) where there is difficulty in performing one or more inventory validation tasks, based on the received inventory validation tasks. For example, processing circuitry 138 or task planner 132 may determine that there is difficulty in performing one or more validation tasks when one or more inventory validation tasks for the region were not completed within a predetermined amount of time, more than a predetermined number of inventory validation tasks for the region are outstanding, or more than a predetermined number of inventory validation tasks for the region have been pending for more than a predetermined amount of time. In some implementations, processing circuitry 138 or task planner 132 may predict that there will be difficulty in performing one or more inventory validation tasks when a large number of tasks are requested in a short period of time for a region with limited access in order to avoid a situation in which inventory validation tasks are not able to be performed within a desired time.

At 506, processing circuitry (e.g., 138 and/or task planner 132) may request a shortcut to be generated in a storage rack to provide a path segment that drone 140 is able to reach region 302 and perform the inventory validation task in the determined region. In some implementations, if multiple possible path segments are identified, processing circuitry 138 and/or task planner 132 may select one of the path possible path segments to generate the shortcut. In some implementations, processing circuitry (e.g., 138 and/or task planner 132) may transmit the request to warehouse management system 110 to instruct one of inventory moving devices 116 to remove items stored that the identified possible path segment.

The present disclosure may be practiced as a method or device adapted to practice the method. It is understood that the examples in this application are intended in an illustrative rather than in a limiting sense. In accordance with the present disclosure, limitations of current systems for drones to quickly navigate to desired locations in warehouse to perform inventory validation tasks have been reduced or eliminated. While certain aspects of the present disclosure have been particularly shown and described with reference to exemplary embodiments thereof, it will be understood by those of ordinary skill in the art that various changes in form and details may be made therein without departing from the spirit and scope of the present disclosure as defined by the following claims. It will also be understood that the components of the present disclosure may comprise hardware components or a combination of hardware and software components. The hardware components may comprise any suitable tangible components that are structured or arranged to operate as described herein. Some of the hardware components may comprise processing circuitry (e.g., a processor or a group of processors) to perform the operations described herein. The software components may comprise code recorded on tangible computer-readable medium. The processing circuitry may be configured by the software components to perform the described operations. It is therefore desired that the present embodiments be considered in all respects as illustrative and not restrictive.

What is claimed is:

1. A warehouse method, comprising:
   receiving status of inventory moving tasks for a warehouse;
   determining, using control circuitry, a predicted route of an inventory moving device from a first location to a second location in the warehouse based on the status of the inventory moving tasks;
   predicting, using the control circuitry, at least one location of the inventory moving device along the predicted route;
   determining, using the control circuitry, a plurality of paths from a current location of an aerial vehicle to a desired location in the warehouse; and
   determining, using the control circuitry, an obstacle-free path of the aerial vehicle, from the current location to the desired location, by selecting one of the plurality of paths that does not intersect with the inventory moving device at the predicted at least one location based on estimated travel times or distances of the aerial vehicle from the current location to the desired location along the plurality of paths.

2. The warehouse method of claim 1, wherein the inventory moving tasks comprise a task to move an inventory item from the first location to the second location in the warehouse.

3. The warehouse method of claim 1, wherein predicting at least one location of the inventory moving device comprises:
   identifying a task, among the inventory moving tasks, associated with moving an inventory item from the first location to the second location;
   predicting the at least one location of the inventory moving device along the predicted route based on the status of the identified task.

4. The warehouse method of claim 3, wherein determining the predicted route from the first location to the second location for the identified task comprises predicting the route by analyzing past routes taken by inventory moving devices in the warehouse.

5. The warehouse method of claim 1, wherein determining the obstacle-free path of the aerial vehicle from the current location to the desired location comprises:
   determining the plurality of paths from the current location of the aerial vehicle to the desired location, based on free space around a plurality of storage racks arranged in the warehouse.

6. The warehouse method of claim 5, wherein:
the plurality of storage racks is arranged into a plurality of rows in a storage area of the warehouse; and
the free space around the plurality of storage racks comprises aisles separating adjacent ones of the plurality of storage racks arranged in the plurality of rows and at least one thruway of the storage area.

7. The warehouse method of claim 6, wherein:
the free space around the plurality of storage racks further comprises a shortcut through a first one of the plurality of storage racks; and
the shortcut comprises a path connecting adjacent aisles through the first one of the plurality of storage racks, the path being formed by at least one empty storage location of the first one of the plurality of storage racks.

8. The warehouse method of claim 7, wherein determining the obstacle-free path comprises determining a plurality of path segments along at least one of: the at least one thruway, one or more of the aisles, or the shortcut; and
wherein the method further comprises instructing the inventory moving device to generate the shortcut by removing an inventory item from the first one of the plurality of storage racks to create the at least one empty storage location.

9. The warehouse method of claim 1, wherein:
determining the predicted route of the inventory moving device comprises determining a two-dimensional path of the inventory moving device on a ground of the warehouse; and
the obstacle-free path comprises an obstacle-free three-dimensional path.

10. The warehouse method of claim 9, wherein:
the warehouse comprises a plurality of storage racks arranged in a storage area of the warehouse;
determining the plurality of paths comprises determining, in space above the two-dimensional path, a plurality of three-dimensional paths from the current location of the aerial vehicle to the desired location;
determining the obstacle-free three-dimensional path comprises:
  determining whether each of the determined plurality of three-dimensional paths intersects with the inventory moving device; and
  selecting one of the determined plurality of three-dimensional paths determined to not intersect with the inventory moving device as the obstacle-free three-dimensional path, based on estimated travel times of the aerial vehicle along each of the plurality of three-dimensional paths; and p1 determining whether each of the determined plurality of three-dimensional paths intersects with the inventory moving device comprises:
for each of the determined plurality of three-dimensional paths,
  determining whether the inventory moving device will be located on the two-dimensional path below the three-dimensional path;
  in response to determining that the inventory moving device will not be located on the two-dimensional path below the three-dimensional path, determining that the three-dimensional path does not intersect with the inventory moving device; and
  in response to determining that the inventory moving device will be located on the two-dimensional path below the three-dimensional path:
    determining whether the aerial vehicle is able to travel above an operating height of the inventory moving device, wherein the operating height of the inventory moving device is determined based on the type of the inventory moving device;
    in response to determining that the aerial vehicle is able to travel above the operating height of the inventory moving device, determining that the three-dimensional path does not intersect with the inventory moving device; and
    in response to determining that the aerial vehicle is not able to travel above the maximum operating height of the inventory moving device, determining that the three-dimensional path does intersect with the inventory moving device.

11. A warehouse system, comprising:
a memory storing instructions; and
control circuitry configured to execute the instructions stored in the memory to:
  receive status of inventory moving tasks for a warehouse;
  determine a predicted route of an inventory moving device from a first location to a second location in the warehouse based on the status of the inventory moving tasks;
  predict at least one location of the inventory moving device along the predicted route;
  determine a plurality of paths from a current location of an aerial vehicle to a desired location in the warehouse; and
  determine an obstacle-free path of the aerial vehicle, from the current location to the desired location, by selecting one of the plurality of paths that does not intersect with the inventory moving device at the predicted at least one location based on estimated travel times or distances of the aerial vehicle from the current location to the desired location along the plurality of paths.

12. The warehouse system of claim 11, wherein the control circuitry is further configured, when predicting at least one location of the inventory moving device to:
  identify a task, among the inventory moving tasks, associated with moving an inventory item from the first location to the second location; and
  predict the at least one location of the inventory moving device along the predicted route based on the status of the identified task.

13. The warehouse system of claim 12, wherein the control circuitry is further configured, when determining the predicted route from the first location to the second location for the identified task, to predict the route by analyzing past routes taken by inventory moving devices in the warehouse.

14. The warehouse system of claim 11, wherein the control circuitry is further configured, when determining the obstacle-free path of the aerial vehicle from the current location to the desired location, to:
  determine the plurality of paths from the current location of the aerial vehicle to the desired location, based on free space around a plurality of storage racks arranged in the warehouse.

15. The warehouse system of claim 14, wherein:
the plurality of storage racks is arranged into a plurality of rows in a storage area of the warehouse; and
the free space around the plurality of storage racks comprises aisles separating adjacent ones of the plurality of storage racks arranged in the plurality of rows and at least one thruway of the storage area.

16. The warehouse system of claim 15, wherein:
the free space around the plurality of storage racks further comprises a shortcut through a first one of the plurality of storage racks;
wherein the shortcut comprises a path connecting adjacent aisles through the first one of the plurality of storage racks, the path being formed by at least one empty storage location of the first one of the plurality of storage racks.

17. The warehouse system of claim 16, wherein the control circuitry is further configured, when determining the obstacle-free path, to determine a plurality of path segments along at least one of: the at least one thruway, one or more of the aisles, or the shortcut.

18. The warehouse system of claim 11, wherein:
wherein the control circuitry is further configured, when predicting the at least one location of the inventory moving device along the predicted route, to determine a two-dimensional path of the inventory moving device on a ground of the warehouse based on the status of the inventory moving tasks; and
the obstacle-free path comprises an obstacle-free three-dimensional path.

19. The warehouse system of claim 18, wherein:
the warehouse comprises a plurality of storage racks arranged in a storage area of the warehouse;
the control circuitry is further configured, when determining plurality of paths, to determine, in space above the two-dimensional path, a plurality of three-dimensional paths from the current location of the aerial vehicle to the desired location;
the control circuitry is further configured, when determining the obstacle-free three-dimensional path, to:
determine whether each of the determined plurality of three-dimensional paths intersects with the inventory moving device; and
select one of the determined plurality of three-dimensional paths determined to not intersect with the inventory moving device as the obstacle-free three-dimensional path, based on estimated travel times of the aerial vehicle along each of the plurality of three-dimensional paths; and
the control circuitry is further configured, when determining whether each of the determined plurality of three-dimensional paths intersects with the inventory moving device, to:
for each of the determined plurality of three-dimensional paths,
determine whether the inventory moving device will be located on the two-dimensional path below the three-dimensional path;
in response to determining that the inventory moving device will not be located on the two-dimensional path below the three-dimensional path, determine that the three-dimensional path does not intersect with the inventory moving device; and
in response to determining that the inventory moving device will be located on the two-dimensional path below the three-dimensional path:
determine whether the aerial vehicle is able to travel above an operating height of the inventory moving device, wherein the operating height of the inventory moving device is determined based on the type of the inventory moving device;
in response to determining that the aerial vehicle is able to travel above the operating height of the inventory moving device, determine that the three-dimensional path does not intersect with the inventory moving device; and
in response to determining that the aerial vehicle is not able to travel above the maximum operating height of the inventory moving device, determine that the three-dimensional path does intersect with the inventory moving device.

20. A traffic management method for a warehouse, comprising:
receiving status of ground-based mobile machines that travel in two-dimension paths on a ground of the warehouse;
determining, using control circuitry, a plurality of predicted two-dimensional routes of the ground-based mobile machines based on the received status;
predicting, using the control circuitry, respective locations of the ground-based mobile machines along the plurality of predicted two-dimensional routes;
determining, using the control circuitry, a plurality of three-dimensional paths from a current location of an aerial vehicle to a desired location in the warehouse; and
determining, using the control circuitry, an obstacle-free three-dimensional path of the aerial vehicle, from the current location to the desired location, by selecting one of the plurality of three-dimensional paths that does not intersect with the ground-based mobile machines at the predicted respective locations based on estimated travel times or distances of the aerial vehicle from the current location to the desired location along the plurality of three-dimensional paths.

* * * * *

UNITED STATES PATENT AND TRADEMARK OFFICE
CERTIFICATE OF CORRECTION

| | | |
|---|---|---|
| PATENT NO. | : 12,441,543 B2 | Page 1 of 1 |
| APPLICATION NO. | : 17/534874 | |
| DATED | : October 14, 2025 | |
| INVENTOR(S) | : Luca Gherardi et al. | |

It is certified that error appears in the above-identified patent and that said Letters Patent is hereby corrected as shown below:

In the Claims

Claim 3, Column 14, Line 52, insert --and-- after ";"

Claim 10, Column 15, Line 49, delete "p1"

Claim 10, Column 15, Line 49, move "determining" to the next line and remove one level of indenting of the moved text Claim 19, Column 17, Line 28, insert --the-- before "plurality"

Signed and Sealed this
Tenth Day of February, 2026

John A. Squires
*Director of the United States Patent and Trademark Office*